United States Patent
Saraswat et al.

(10) Patent No.: US 11,087,248 B2
(45) Date of Patent: Aug. 10, 2021

(54) SYSTEMS AND METHODS FOR CONTEXTUAL RECOMMENDATION OF LEARNING CONTENT

(71) Applicant: Tata Consultancy Services Limited, Mumbai (IN)

(72) Inventors: Nidhi Saraswat, Gurgaon (IN); Hiranmay Ghosh, Gurgaon (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 811 days.

(21) Appl. No.: 15/055,265

(22) Filed: Feb. 26, 2016

(65) Prior Publication Data

US 2016/0321585 A1 Nov. 3, 2016

(30) Foreign Application Priority Data

Apr. 30, 2015 (IN) .......................... 1741/MUM/2015

(51) Int. Cl.
| | |
|---|---|
| *G06Q 10/06* | (2012.01) |
| *G06N 7/00* | (2006.01) |
| *G06N 20/00* | (2019.01) |
| *G06F 16/9536* | (2019.01) |

(52) U.S. Cl.
CPC ....... *G06Q 10/06311* (2013.01); *G06N 7/005* (2013.01); *G06N 20/00* (2019.01); *G06F 16/9536* (2019.01)

(58) Field of Classification Search
CPC ..... G06F 16/9536; G06N 7/005; G06N 20/00
See application file for complete search history.

(56) References Cited

U.S. PATENT DOCUMENTS

| | | | |
|---|---|---|---|
| 6,606,480 B1 | 8/2003 | L'Allier et al. | |
| 6,892,049 B2 | 5/2005 | Phalp et al. | |
| 7,139,757 B1* | 11/2006 | Apollonsky | ...... G06F 17/30722 |
| 8,909,611 B2 | 12/2014 | Dinger et al. | |
| 2009/0037355 A1* | 2/2009 | Brave | ............... G06F 17/30867 706/45 |
| 2010/0153324 A1* | 6/2010 | Downs | ................... G06F 40/258 706/21 |
| 2012/0164620 A1 | 6/2012 | Needham et al. | |
| 2013/0275425 A1 | 10/2013 | York et al. | |
| 2015/0088801 A1* | 3/2015 | Sbaiz | .................... H04L 67/306 706/52 |

OTHER PUBLICATIONS

The Lumikre Project: Bayesian User Modeling for Inferring the Goals and Needs of Software Users; Proceedings of the Fourteenth ; Conference on Uncertainty in Artificial Intelligence, Madison, WI, Jul. 1998; Eric Horvits et al. (Year: 1998).*

* cited by examiner

*Primary Examiner* — Deirdre D Hatcher
(74) *Attorney, Agent, or Firm* — Finnegan, Henderson, Farabow, Garrett & Dunner, LLP (57) ABSTRACT

Systems and Methods for contextual recommendation of learning content based on various parameters and using probabilistic framework are provided. The recommendation system is a function of learner's profile, job context and learner's role wherein utility values are computed and combined for each of the learning content and compared to enable the system to recommend the most relevant learning content to the learner. The system further utilizes Bayesian reasoning model for otherwise inaccurately specified parameters to impart robustness and flexibility to the system.

13 Claims, 7 Drawing Sheets

| | |
|---|---|
| *A. Topic-Proficiency tuple* | |
| Topic | One or more set of topics from [8] |
| Proficiency | One of<br>{0: Naive, 1: Basic knowledge, 2: Novice, 3: Intermediate, 4: Advanced, 5: Expert} |
| *B. User Profile Model* | |
| User-ID | Unique Identifier for a user |
| User Name | Given name of the user |
| Competencies | An array of <topic, proficiency> tuples |
| *C. Role Model* | |
| Role-ID | Unique identifier for a given role |
| Skill requirement | An array of *<topic, proficiency>* tuples |
| *D. Task Model* | |
| Task-ID | Unique Identifier |
| Task Description | Description of the task assigned |
| Topic-Proficiency | An array of *<topic, proficiency>* tuples |
| *E. Task-Time Tuple* | |
| Task ID | See above |
| Time | One of<br>{0: Immediate, 1: Short, 2: Long} |
| *F. Allocation* | |
| User-ID | See above |
| User Role | One of Role-ids |
| User Tasks | An array of *<task-ID, time>* tuples |
| *G. Content Modelling* | |
| General/Identifier | Unique identifier of Learning Object. |
| General/Title | Name of Learning Object. |
| General/Author | Author of Learning Object. |
| General/Description | Description about Learning Object. |
| General/Keyword | Topics selected from a set of topics [8]. |
| Educational/Difficulty Level | One of<br>{0: Very Easy, 1: Easy, 2: Medium, 3: Difficult, 4: Very Difficult} |
| Educational/Learning Resource Type | One of<br>{0: Category-1, 1: Category-2, 2: Category-3} |
| Educational/Typical Learning Time | One of<br>{0: Very low (≤ ½ day), 1: Low (½- 2 days), 2: Medium (2-15 days), 3: High (15-45 days), 4: Very High (≥ 45 days)} |
| Technical/Location | URL of Learning Object. |

SYSTEMS AND METHODS FOR CONTEXTUAL RECOMMENDATION OF LEARNING CONTENT

CROSS-REFERENCE TO RELATED APPLICATIONS AND PRIORITY

The present application also claims benefit from Indian Complete Patent Application No. 1741/MUM/2015, filed on Apr. 30, 2015, the entirety of which is hereby incorporated by reference.

TECHNICAL FIELD

The present invention relates to content recommendation, and more particularly, the invention relates to contextual recommendation of relevant content to users as they interact with copious volume of learning content available.

BACKGROUND

Introduction of new technologies with changing job profile requires a professional to prepare and hone himself with desired skill set. Ample online contents exists on corporate networks and Internet to facilitate such retraining.

There has been significant contemporary research interest in recommendation engines in recent past. A large proportion of publications on the recommendation engines deals with movies (25%) and re-tail shopping (20%). With continued growth of educational contents on the Internet, there has been significant research interest in creating recommendation engines for educational contents also.

Broadly, recommendation technologies can be categorized into below three categories:

Collaborative filtering techniques: This approach involves analyzing purchase or usage behavior of different users and to cluster them in groups. A user in a group is recommended product(s) purchased or used by other users in the group. This approach is commonly used in many retail portals and in movie or music recommendation.

Content based filtering techniques: This approach is based on the similarity of products. A user is recommended a product that is similar to the products that he/she has already purchased or used. The similarity of the products is often established with a product ontology.

Rule based techniques: This technique attempts to match a product profile with user profile based on a set of rules. The rules are often derived from expert knowledge. Static nature and possible dispute over the rules is a major hindrance in deployment of this technique. It is generally used only when the other two methods do not work.

In the domain of e-learning, educational contents can be viewed as products and the learners can be viewed as the buyers or users. One of the objective of a personalized recommendation engine in e-learning context is to recommend the learning contents that are likely to be appreciated by the learner. This demands that the recommendations are tuned according to the user needs. There are instances of all three earlier mentioned approaches to construct recommendation engines in the e-learning domain, with the content based filtering approach dominating. This represents a rule-based engine where recommendation rules bridge the current state of user knowledge and learning objects from multiple repositories.

However, finding suitable content in the specific retraining context from large volume of contents has remained a formidable task. While there is a significant corpus of work in educational content recommendation, none of them accounts for the requirements of users in context of his job profile and work-in-hand.

The recommendation systems reviewed so far are primarily designed for academic environment, where the user model is based on his academic goals, preferences and past learning history. None of the recommendation systems account for the contextual need of the learner, i.e. his/her immediate needs for the knowledge depending on his/her job-profile or his/her task-in-hand. Further, most of the recommendation engines use content based filtering approach, which essentially means that the contents similar to those already experienced by the learner is recommended. This may result in feeding the learner with redundant recommendations, since progressive enrichment in learner's knowledge-state and depth of contents of the learning contents are not accounted for.

Within the prior art available in this domain, an architectural framework(s) for context-aware e-learning system are available. While the necessity of 'context-awareness' has been highlighted, no details of context model is available. On the other hand, there has been some efforts in contextual information retrieval in business process-oriented knowledge portals. However, there has been no attempt to recommend learning contents in context of a user current knowledge needs.

SUMMARY

Before the methods, systems, and hardware enablement(s) related to the present invention are described, it is to be understood that the present invention is not limited to particular systems, and methodologies described, as there can be multiple possible embodiments of the present invention which are not expressly illustrated in the present disclosure. It is also to be understood that the terminology used in the description is for the purpose of describing versions or embodiments only, and is not intended to limit the scope of the present invention which will be limited only by the appended claims.

In an embodiment, there is provided a method for enabling contextual recommendation of relevant learning content from multitude of learning contents. According to the embodiment, a large volume of learning content sourced from a corpora of structured or unstructured sources is maintained in at least one repository. Next, a data model defining learner associated contextual information in relation to learner profile, learner job context and learner role is generated, followed by computing of one or more utility values of the plurality of learning contents using probabilistic reasoning being conditioned by the data model so generated; the one or more utility values obtained with respect to each of learner profile, learner job context and learner role is combined to obtained an aggregated utility value for each learning content of the plurality of learning contents; and the aggregated utility value computed for respective learning content is compared against another to enable system to recommend the most relevant learning content to a learner.

In another embodiment, there is provided a system for enabling contextual recommendation of relevant content from multitude of learning contents is disclosed. Broadly, the system comprises a processor; one or more input means and an output means, each being in electronic communication with the processor; at least one repository that is accessible to the processor and has resident thereon; a database that comprises the learning contents sourced from a corpora of structured or unstructured sources via the input means. The processor herein is operable to perform steps including:

generating a data model defining learner associated contextual information;
   computing utility values of the learning contents using probabilistic reasoning being conditioned by the data models so generated;
   combining the utility values associated with each of the learner associated contextual information to obtain an aggregated utility value for each of the learning contents; and
   recommending most relevant learning content to the learner by comparing the aggregated utility values obtained for the learning contents.

In another embodiment, there is provided a computer program product for enabling contextual recommendation of relevant content comprising a non-transitory computer readable medium having program instructions for: maintaining, in at least one repository, plurality of learning contents sourced from a corpora of structured or unstructured sources; generating a data model defining a learner associated contextual information; computing one or more utility values of the plurality of learning contents using probabilistic reasoning being conditioned by the data model so generated; combining the utility values associated with each of the learner associated contextual information to obtain an aggregated utility value for each learning content of the plurality of learning contents; and recommending the most relevant learning content to the learner by comparing the aggregated utility values obtained for the each learning contents.

In yet another embodiment, the probabilistic reasoning is done with Bayesian networks that computes utility values associated with the learning contents for each of the learner profile, the learner role and the learner job context for a given learner.

In another embodiment, the plurality of utility values computed for each of the learning content are combined using Sigmoid Probability Density Function to compute an overall utility value associated with the learning content.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings:

FIG. 4 along with FIGS. 4(a), 4(b), 4(c) and 4(d) depict the reasoning model used in recommendation system in accordance with one preferred embodiment of present disclosure.

DETAILED DESCRIPTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

Method and system for recommending reasoning model for a contextual recommendation for learning contents are disclosed. The system is capable of integrating learning content from multiple structured repositories as well as unstructured sources or informal knowledge resources on the Internet. The proposed recommendation method involves a rule-based recommendation system, where the recommendations are functions of learner's job profile, task-in-hand, learner role, learner's background and the learning object attributes. It should be noted that following terms "learning object(s) [LO(s)]" and "learning content(s)" are being used interchangeably and referring to same meaning throughout the specification pertaining to present invention. Similarly, the terms "system" and "recommendation system" are being used interchangeably and refer to same meaning through the specification pertaining to present invention. In continuation, it should be noted that hereinafter "learner" and "user" are used interchangeably to avoid any confusion and to substantiate the clarity in the disclosure.

In the background of inflexible and restrictive nature of rule based recommendation systems, the system of present invention deploys a Bayesian reasoning scheme to bring much needed flexibility and agility to the system.

Figure 1:
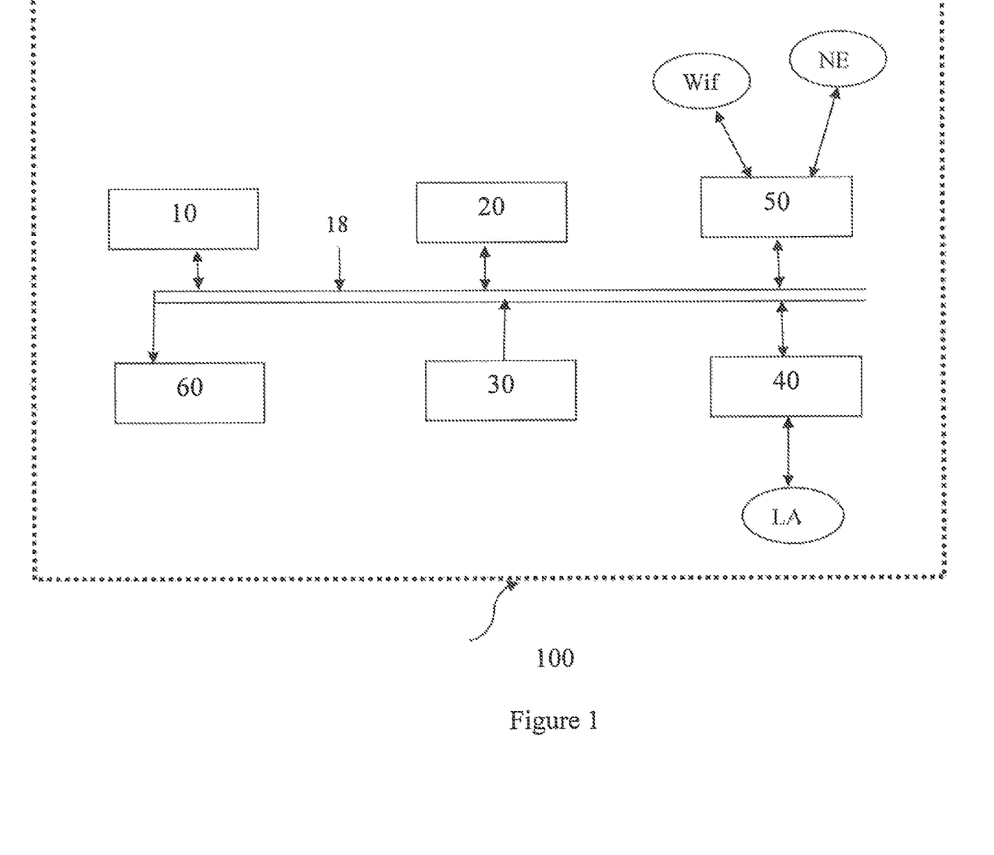
FIG. 1 is a schematic diagram of an exemplary architecture for the system of the present disclosure.

As discussed above, the recommendation system considers three major inputs or entities: (1) Learner Profile, (2) Job Context and (3) Learner Role, all together commonly referred to as learner associated contextual information. Referring now to FIG. 1, the system 100 disclosed herein incorporates a plurality of components, including a processor 10 operatively linked to communicate with repository 20 via a bus structure 18. The repository 20 configured to include storage mediums including without limitation random access memory, static memory, a hard drive, an optical drive, or the like to permanently or temporarily store constants, programs being executed, or related data.

Further coupled to bus 18 may be input means 30, for example, a keyboard; it could alternately or in addition comprise a pointing device, such as a mouse, or touch screen that is used by the user to interact with the recommendation system, log in to the system 100 and authenticate the system 100, and to physically engage with display. The system 100 further provides the user with flexibility and enablement to select a recommended content for on-screen reading or downloading the content or even rating thereof. A local area network (LAN) interface 40 enables the system 100 to communicate with the local network (e.g., intranet). Further, a remote network interface 50 provides bidirectional communication with the World Wide Web or other remote networks (e.g., Internet), either through telecommunications or through other forms of data transmission without limitation. The system 100 uses the local area network (LAN) interface 40 and/or network interface 50 to source data from both structured and unstructured sources and store in the repository 20. During normal operation of the system 100, recommended information can be displayed on the output means 60 like a display unit, under control of the processor 10.

The method for contextual recommendation of relevant content from multitude of learning contents to the learner utilizing probabilistic reasoning framework may be implemented on hardware (processor 10) or a combination of software and hardware. For example, they may be implemented in an operating system kernel, on a specially constructed machine, or on a network interface card. In a specific embodiment, it may be implemented as software such as an operating system or in/as an application running on an operating system.

Software/hardware hybrid implementation(s) of at least some of the embodiment(s) disclosed herein may be implemented on a programmable machine selectively activated or reconfigured by a computer program stored in memory of repository 20 as indicated above. Such network devices may have multiple network interfaces that may be configured or designed to utilize different types of network communication protocols. It should be noted that, at least some of the features and/or functionalities of the various embodiments disclosed herein may be implemented on one or more general-purpose network host machines such as an end-user computer system, computer, network server or server system, or any other suitable electronic device, router, switch, or the like, or any combination thereof.

Figure 2:
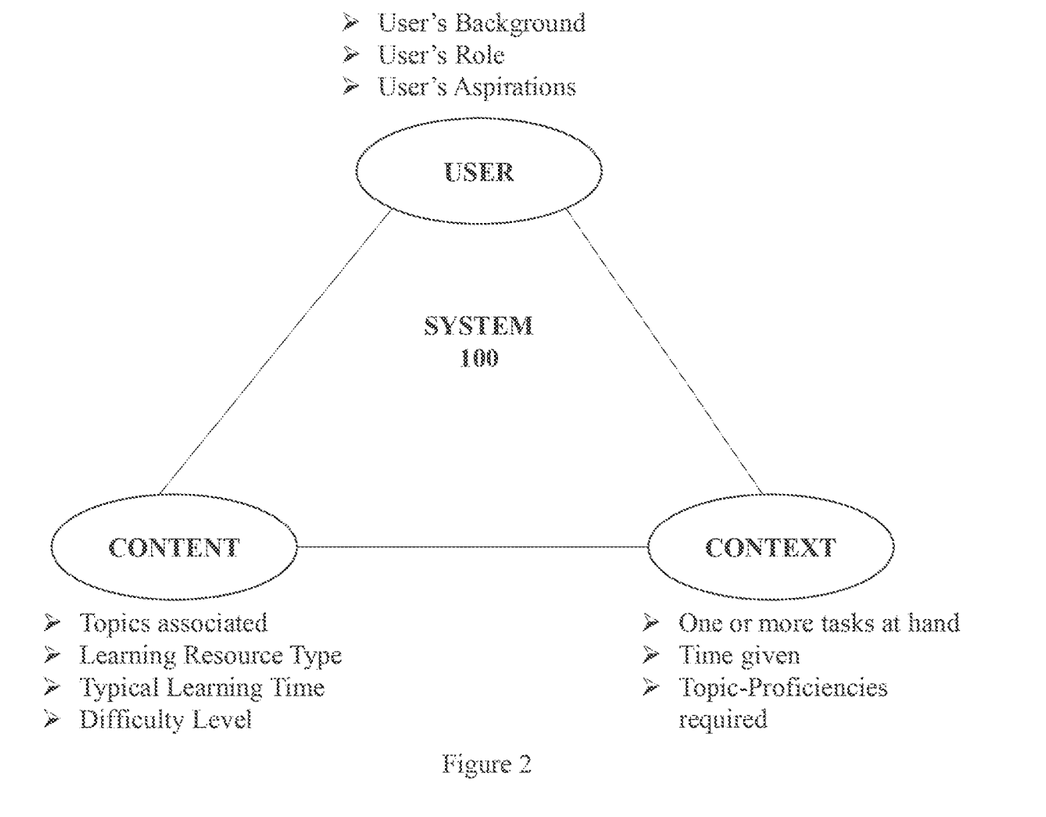
FIG. 2 illustrates a conceptual architecture of an embodiment of the present disclosure.

Broadly, the architecture of the system 100 involves the learner profile, the learner job context and learning content attributes as three major inputs is illustrated in FIG. 2. The learner profile comprises learner's background or his/her current knowledge state and role that defines his long-term aspirations towards acquiring knowledge. The learner profile is modeled based on proficiency levels of the learner. The learner job context relates to tasks at hand characterized by required proficiency level in different knowledge domains and time available to accomplish the tasks in a given time. Time attribute of the learner job context is total time given for learning and completion of the given task, in an embodiment, the learner job context is modeled based on task assigned to the learner, learner's defined level of proficiency to complete the task in a given amount of time, time frame allocated to obtain desired proficiency level in assigned task and time allocated to complete the assigned task or a combination thereof. The learning contents are characterized by several attributes, like the topics covered, depth of contents and estimated learning time.

For example, a learner, new to a corporate set up, who has been allocated one of the task to explore a suitable model for the recommendation system based on probabilistic reasoning principles. Say, he/she needs to report his/her progress to a research council on a weekly basis. This job-definition requires that the learner acquires in-depth knowledge of the recommendation system based on probabilistic reasoning principles over a few weeks' time. In continuation, the learner also needs to acquire basic familiarity with an editing tool, such as 'Latex', that might have been standardized for preparing reports in the research lab. If an assumption is drawn that the user has some familiarity with Bayesian reasoning systems, however, the learner is partly or completely naive with word processing tool, it is desirable that the recommendation system 100 provide him/her with some short tutorial on 'Latex' and some in-depth learning material on the probabilistic reasoning methods, for example an e-book or a web-course pertaining to subject(s). Considering the role of the learner as "Researcher" in some specific domain, the system 100 may also recommend some other learning contents in that domain befitting his background knowledge. As the learner acquire proficiency in the various topics, more in-depth material should be recommended. With a change in the learner's job context, the learner needs to acquire proficiency in new subjects and the recommendations to be appropriately modified.

The system 100 is provided with a Bayesian network, there are different attributes of learner profile and learner job context causing different attributes, e.g. topic, difficulty level, etc. of learning objects to be suitable for a particular learner. The overall utility of existing and available learning contents is determined by feeding the Bayesian network that has been conditioned by the learner profile, learner role and job context. In continuation, the method involves ranking the recommendation objects wherein there is always the risk involved of presence of many similar items on the top of ranked list. This is especially true when the repository of contents is large and contain multiple and redundant learning objects for every topic. The system 100 further envisages diversity in the recommendation set, so that learning contents on different relevant topics are recommended, discussed here in later sections.

Figure 3:
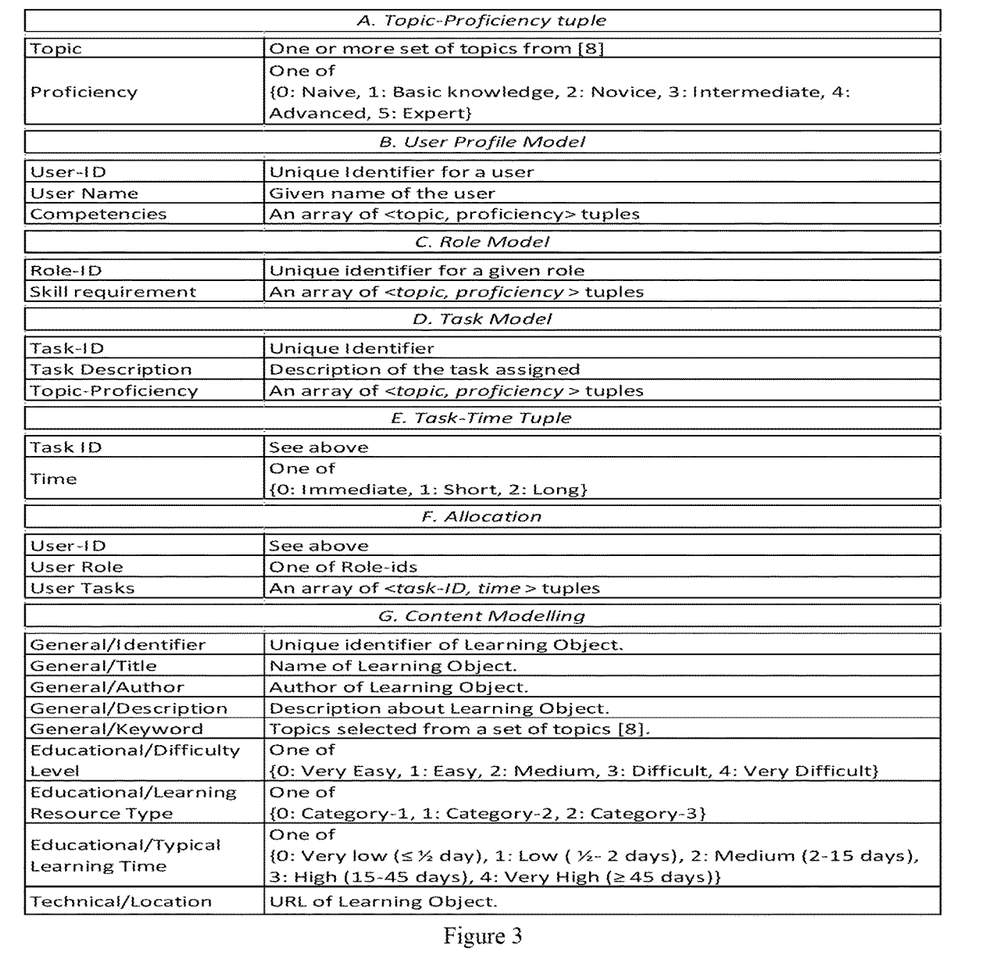
FIG. 3 is an example data model for recommendation in accordance with one exemplary embodiment of present disclosure.

According to one embodiment, the method for enabling contextual content recommendation implemented by the processor 10 includes creation of data model for three entities as specified earlier including—Learner Profile, learner Job Context and Learner Role used in the recommendation system 100. A tabular depiction of data model comprising aforementioned three entities, in accordance with one exemplary embodiment of the present disclosure, is illustrated in FIG. 3 wherein a topic proficiency tuple is considered as a building block in some of the data models. A <topic, proficiency> tuple indicates a proficiency in a certain topic. As can be seen in FIG. 3, the proficiency for various topics has been modeled on a six point scale.

Learner Profile Model:

Learner profile in e-learning context generally comprises user competencies and his/her learning goals. Obtaining reliable information in either of the two aspects is a difficult job. There are two sources of such information that are considered relevant for exemplary purposes including without limitation self-declared and assessed sources. Other sources can be used for the purpose of information collection and the disclosure concluding with these two sources shall not be construed as limiting the scope of present disclosure:

a) Self-declared: As declared in a bio-data created by the learner, his personal web-site, etc.

b) Assessed: As obtained from a formal evaluation and recorded in some Learning Management System (LMS), well known in available literature.

While results of formal assessment may be more reliable, they are generally less granular.

Learner Job Context Model:

Context is one of the most difficult aspect to understand and model in a given system. In general, 'job context' can include many facets including the learner persona, the environment where it is situated and many such factors, however for the purposes of present invention, the job context is restricted to two aspects based on the organizational needs: (a) the role assigned to learner and (b) tasks assigned to the learner. It shall however be noted that the present assumption is only for the purposes of explanation and shall not be construed limiting in its spirit and scope.

Role Context

At any given point of time, learner is assigned a role that broadly defines the activities he/she is expected to perform. Each role requires certain competencies or skill-sets that the learner needs to acquire to perform his/her duties and for his/her career growth. Thus, the role of the learner sets a long-term context for his learning.

Generally, there are a number of predefined roles in an organization. In context of learning, a role can be characterized with a set of topics and a proficiency level required for each, expressed as an array of <topic, proficiency>. The data model for role is shown in part C of FIG. 3. Role allocation to the learner in the present context is shown in part F of the FIG. 3.

Task Context:

Learner is generally assigned one or more tasks at any given point of time. Each task requires some skill-set and needs to be completed within a definite deadline. In general, the learning needs for each task can be characterized by an array of <topic, proficiency> tuples and a time limit to acquire the required knowledge. The time available to acquire the knowledge depends on the scheduled completion time of the task. For exemplary purposes, the time-frame can be categorized in three categories as:
a) Immediate: Requirements that need to be fulfilled within 24 to 48 hours. They generally pertain to 'how to', e.g. how to implement a particular logic, how to use a particular tool, and so on. They empower the learner to attend to his/her immediate job function. They are generally answered from informal resources on the intranet and the Internet, such as technical blogs and short tutorials.
b) Short-term: This type of knowledge requirement involves deep knowledge about some specific topic and needs to be acquired within a time-frame of 2 to 6 weeks. Examples include algorithms that can achieve some specific results, e.g. machine learning algorithms for 'clustering'. The sources of such knowledge can be tutorials, short courses, and survey papers available on formal internal knowledge repository and web-sites hosted by reputed institutes.
c) Long-term: These requirements need to be fulfilled, typically within 3 months or beyond, though flexibility exists. They involve acquiring domain expertise in specific domains, e.g. 'big data', 'computer vision' or 'mobility'. Sources of such knowledge are generally web based courses, e-books and such other resources available in the organizational resource pool or in public domain.

The general assumption is that the set of tasks are repetitive and a task database exists in the organization. However, this is not a restrictive assumption because new task definitions can always be added to the database. The Task data model is shown in part D of FIG. 3. Part E of the FIG. 3 associates a task with a time-frame for allocation. The task allocation to the learner is shown in part F of the FIG. 3.

Content Model:

The learner may use learning contents from many different sources, such as technical blogs, tutorials, c-books, digital libraries, video lectures, web-based and so on. Some of the resources are in public domain and can be freely accessed from the Internet. Some other resources are either hosted on the corporate intranet or have subscription based access. In order to integrate the variety of resources, the recommendation system 100 needs to use some common metadata. The virtual library of contents can be built through a collaborative effort of subject experts and reference librarians and the metadata for the learning contents can be created either manually or in an automated way.

There exists a comprehensive set of metadata fields for describing educational contents. Several application profiles are available for use of this standard in specific application scenario. From the context of learning content, the complexity of learning content has been identified as an important aspect in assessing if the given learning content is suitable to the learner in given scenario-referring to learner task and role. Thus, for understanding purposes, the learning content has been classified in categories including Difficulty Level, Typical Learning Time (TLT) and Learning Resource Type (described in detail later).

Difficulty Level (DL) of a learning object or learning content determines the utility of a content for the learner with a certain proficiency level. For example, it is not prudent to provide an advanced level material to a naive user. Similarly, it may not make sense to provide a beginner level material to an expert user. DL can have one of the following values:
a) Very Easy: Content covering basics of a topic, examples and illustrations.
b) Easy: Content covering basics of the topic with a few examples and not a very detailed explanation.
c) Medium: Content covering basics and advanced areas of the topic, examples and illustrations.
d) Difficult: Content covering basics and advanced areas of the topic with a few examples and not a very detailed explanation.
e) Very Difficult: Content that gives a deep insight or knowledge of a topic covering minute details and concepts as well.

Typical Learning Time (TLT) of the learning object helps in determining the utility of the content with respect to the time-frame of an assigned task. For example, it is not prudent to recommend a long web-course in context of a task that needs to be completed in a short time-frame. The possible values of typical learning time are illustrated in Part G of FIG. 3.

Learning Resource Type refers to a nature of the learning resource, e.g. a video-lecture or a tutorial, etc. Different types of resource serve different purposes in an e-learning environment. Each of may be suitable for users with different proficiencies and may lead to different degrees of enrichment in the proficiency levels. For example, a 'reference manual' is meant for a quick reference in a short task context by the expert learner, without enriching his proficiency level. In contrast, a 'web course' may be suitable for the naive user and is likely to significantly enhance his/her skill-level. Based on the applicability, the Learning Resources are classified into three categories for purposes of present invention, though only for illustration and not limiting purposes:
a) Category 1: E-book, Web Course, Advanced Lectures, Advanced Tutorials.
b) Category 2: Primer, Tutorial, Slides, Short Lecture, Problem-Solving Exercise, On-line labs.
c) Category 3: Reference doc Part G in FIG. 3 depicts the content model used in present recommendation system 100.

The recommendation system 100 is based on the generic and conceptual framework for contextual intelligence that proposes the use of a Bayesian reasoning model for contextual recommendation. The justification for using uncertain reasoning for contextual recommendation arises from the fact that the different content and context attributes in a social setting cannot be strictly quantified. Moreover, the different requirements in contextual learning, e.g. utility of the contents for a user/learner with given competency level, the requirements of the allocated role and tasks and the time-frame for consumption, are inexactly known and may pose conflicting requirements on an learning object (LO).

A probabilistic reasoning model is necessary for combining these conflicting requirements with inaccurately specified parameters for achieving robustness. Further, the probabilistic reasoning model can produce flexible results that account for variations in user or learner preferences. The problem is thus modeled as a causal reasoning model, where the attributes of the context causes some learning object attributes to be more suitable than the others. A mixed mode of reasoning is proposed, where the utility of a learning content from different perspectives is determined independently using causal reasoning mode of Bayesian network and combine the results with sigmoid functions.

Now referring to FIG. 4, the reasoning model used in recommendation system 100 is illustrated. FIGS. 4(a), 4(b), 4(c) show the Bayesian networks used for determining the utility of the learning object for the user from three different perspectives, namely a) Utility of the learning object with respect to the knowledge of topics required in the allocated task set b) Utility of the learning object with respect to user's current role, and, c) Utility of a learning object with respect to user's current competencies.

Some of the nodes in the Bayesian networks are treated as input nodes (shown towards the left), which are initialized to a certain state based on the observed values of the user and task attributes and attributes of the learning object leading to the propagation of a belief in the Bayesian network. A posterior probability of a target variable (shown towards the right) represents the belief in the utility value of the learning object from a relative/related perspective. With reference to FIG. 4(d), the probabilistic reasoning model is used to integrate the contextual utility values is illustrated. The probabilistic reasoning model is exercised for each learning object independently to determine its contextual utility, which is subsequently used for ranking the learning objects.

Following are the conventions used in the FIGS. 4(a), 4(b), 4(c) and 4(d):

a) Clear bubbles in the FIGS. 4(a), 4(b), 4(c) and 4(d) represent nodes of the Bayesian networks. Inputs from the shaded nodes are analyzed to instantiate some of the nodes of the Bayesian network. Diamonds depict the combination of at least two of Learning object (LO), User proficiency (U) and Topic proficiency (T) due to Sigmoidal probability distribution function (Discussed in details later). In an embodiment, Diamonds depict one of the intersection of topics and sigmoid conditional probability.

b) The input nodes are prefixed with the entity for which properly holds, e.g. node learning object "LO: TLT" indicates Typical Learning Time for a learning object and "U: Topic, Prof" represents the array of topic-proficiency tuples signifying user competency. Some of the intermediate nodes have two prefixes signifying the entity and the context, e.g., "LO-T: Utility" represents the utility of a learning object in context of Tasks allocated to a user.

c) The numbers in curly braces in the Bayesian nodes represents its possible states. The numeric values for multi-state variables refer to symbolic labels as illustrated in FIG. 3. Even if they may connote some ordering, such connotation is not used in the reasoning model.

Next, the utility values for each of the input node so initialized are computed, discussed herein below:

(i) Utility with Respect to Task or Job Context

Figure 4A:
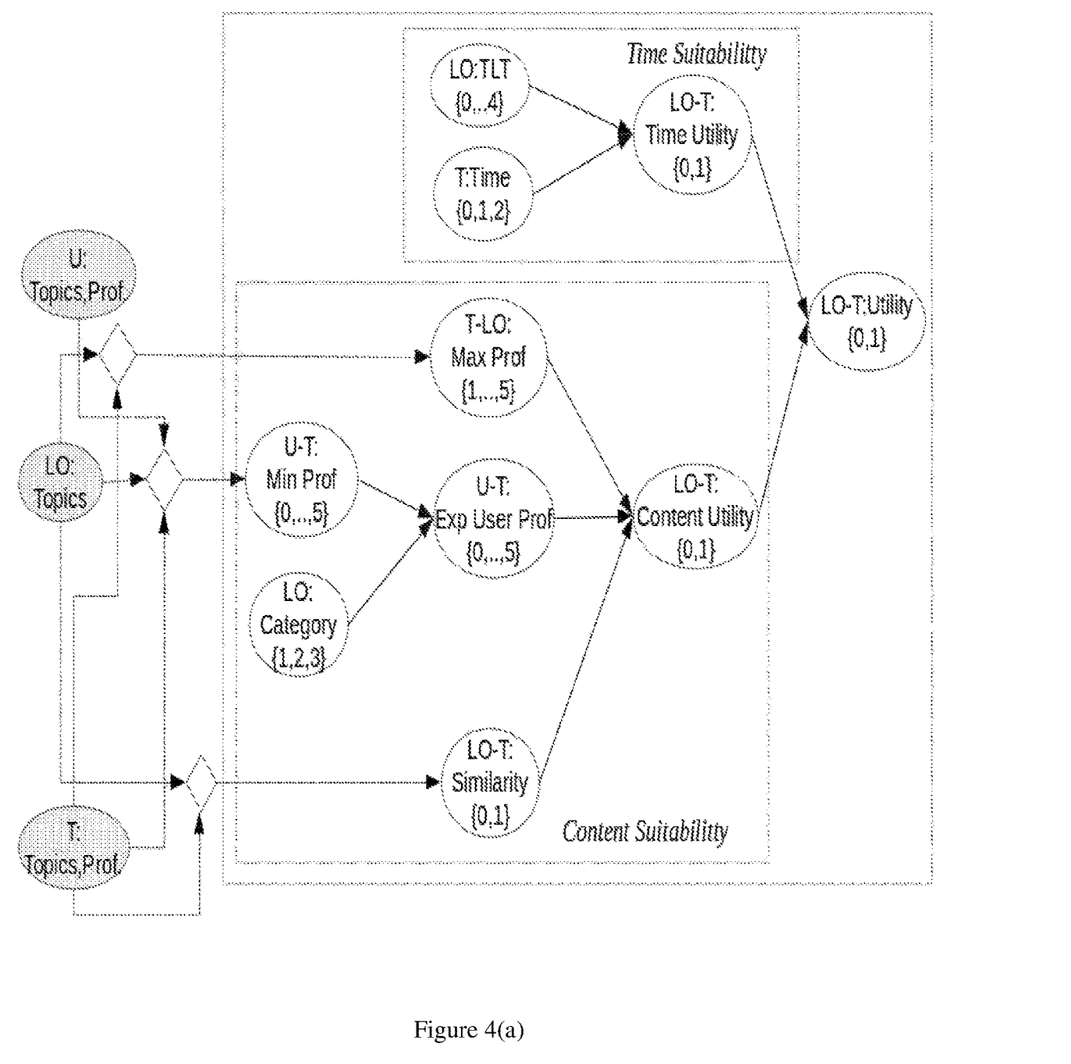

FIG. 4(a) depicts the part of the Bayesian network that is used to compute the utility of a learning object with respect to an allocated task. This is done in two stages:

a) Content utility: Each task requires the knowledge of some topics at a desired proficiency level. This module evaluates if the learning object is expected to impart knowledge at least at desired level of proficiency for one or more of such topics.

b) Time utility: Each task needs to be completed within a finite time. This module evaluates if the learning object can be consumed in the desired time-frame.

Content Utility

The node "LO-T: Similarity" in the Bayesian network 1 (FIG. 4(a)) is a binary node representing the similarity between the topics in a learning object and that in the requirements of a task. A learning object with sufficient similarity with a task is contextually more relevant than others. The similarity between the set of topics required in a task (T: Topic, Prof) and the topics available in an LO (LO: Topics) is computed using Jaccard Coefficient in one embodiment. Other methods may also be employed like natural language processing or speech processing of the contents, etc. A threshold is applied to instantiate the node to 1 if there is adequate compatibility and to 0 otherwise.

The utility of the learning content or learning object in a task context depends on two other parameters (a) the topic proficiencies required by a task and (b) the expected user proficiency on using a learning object. The former is modeled with the node "T-LO: Max Prof". This node is instantiated to the state (one of {1 . . . 5}) corresponding to the maximum of the required proficiency values required for the task with respect to the topics covered in the learning object. The expected user proficiency in any of the covered topics on using a learning object is modeled with the node "U-T: Exp User Prof". A learning object that can raise the user proficiency level to that desired in a task is more contextually relevant than the others. The possible states of this node are the {0 . . . 5}. The expected proficiency level achieved by the user depends on the learner's current proficiency level and the learning resource type. For example, a web-course may take a learner from a low proficiency level to a higher one, while a reference manual will have little impact on raising the proficiency level. These two causal nodes are represented as "LO: Category" and "U-T: Min Prof" respectively in the diagram. The node "LO: Category" can take three possible values {1; 2; 3}. The node "U-T: Min Prof" represents minimum proficiency level of the user on any of the topics that are required in the task context and covered in the learning object. It is instantiated to one of the six possible states {0 . . . 5} that represent the proficiency levels. The node "LO: Category" represents the category of the learning object, which is indicative of learning resource type and can assume one of the three possible values {1; 2; 3}.

The node "LO-T: Content Utility" represents the utility of a learning object with respect to its contents, with parents as "T-LO: Max Prof", "U-T: Exp User Prof", and "LO-T: Similarity". It is a binary node with state 1 representing the utility of the content. Causal relations exist in this network. A child node in this network has multiple parents. The configuration of the states of parent nodes cause some state of the child node to be more probable than others. These causal associations are represented by appropriate Conditional probability Tables (CPT's).

Time Utility:

The time utility of a content depends on its consumption time vis-a-vis the time available for learning in context of the task and is represented by the node "LO-T: Time Utility"

in FIG. 4(a). This is a binary node where the state 1 represents that the content is suitable. The states of the node has causal relations with (a) typical learning time for a content and (b) the time available for the task. The former is represented by the node "LO: TLT" and is instantiated to one of the three possible values {0 . . . 4}. The latter is represented by the node "T: Time" and is instantiated to one of the three possible values {0; 1; 2}. A learning object is considered more suitable if it can be consumed well within the task time. A CPT (Conditional probability Table) represents the causal association between the nodes.

Finally, the overall utility of a learning object in context of a task (represented by the node "LO-T: Utility" in FIG. 4(a)) depends on its content utility ("LO-T: Content Utility") and its time utility "LO-T: Time Utility"). The conditional dependencies between these nodes are reflected in the CPT (Conditional probability Table). Note that, in general, a learner is allocated with more than one task. The utility of a learning object with respect to each task is independently determined using the Bayesian network discussed above.

Figure 4B:
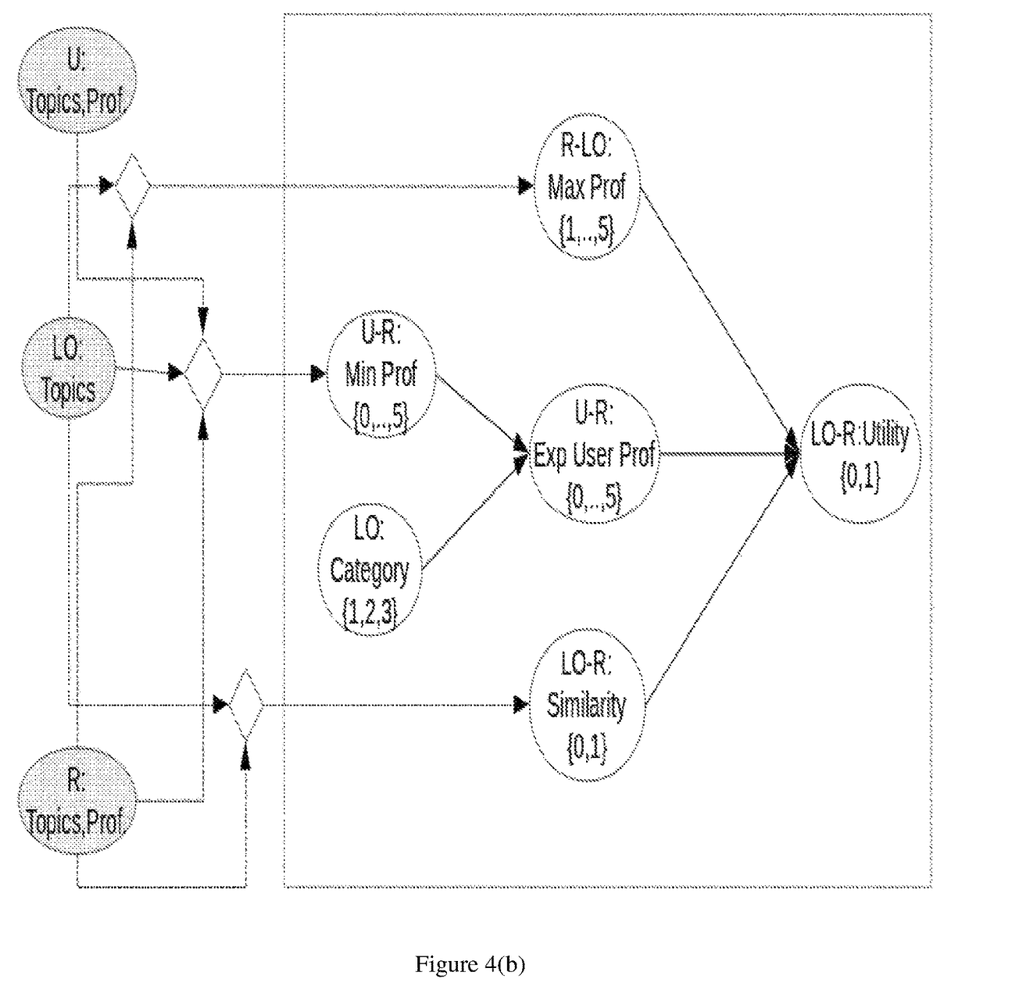

(ii) Role Utility:

Like a task, a role is characterized by the array of <topic, proficiency> tuples. However, there is no time-frame associated with it. It is interpreted as the proficiencies relating to a role can be acquired in a longer term. Thus, the computation for utility of a learning object with respect to the role assigned to a user is similar to estimating content utility as described in the previous section. FIG. 4(b) depicts the Bayesian network used for computing role utility.

Figure 4C:
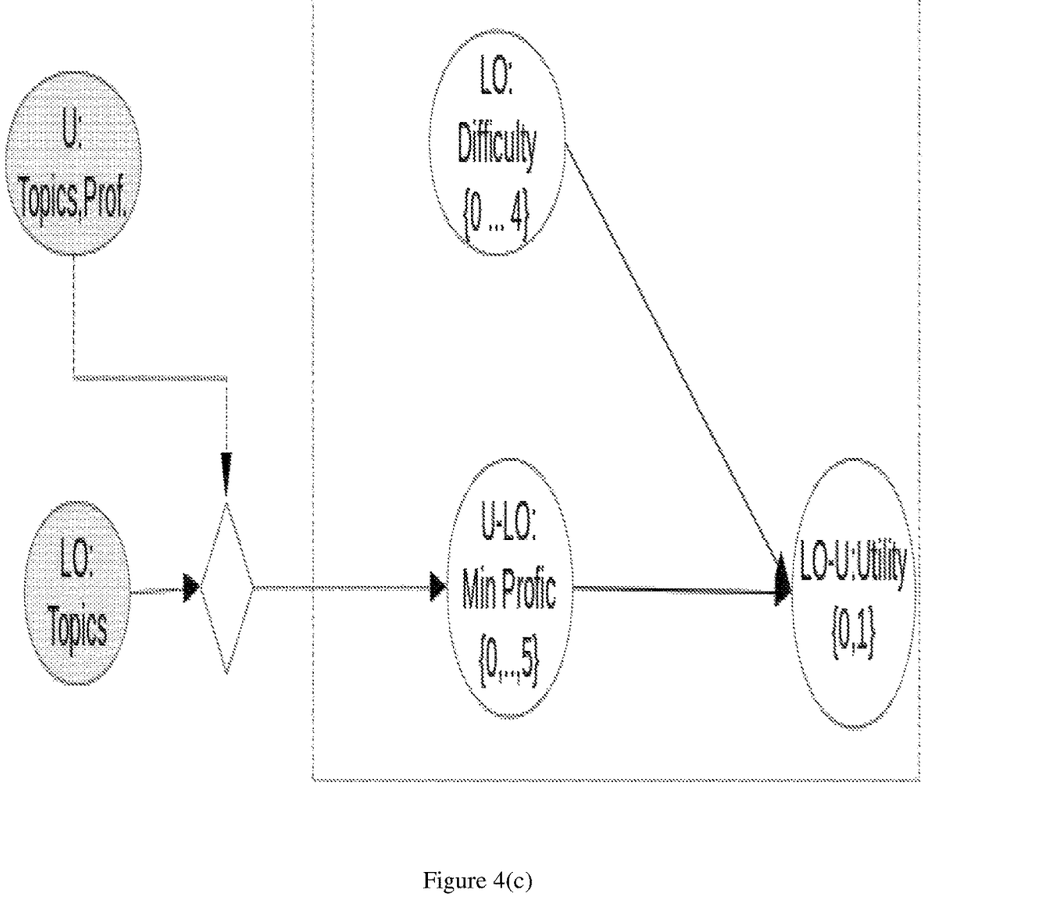
Figure 4D:
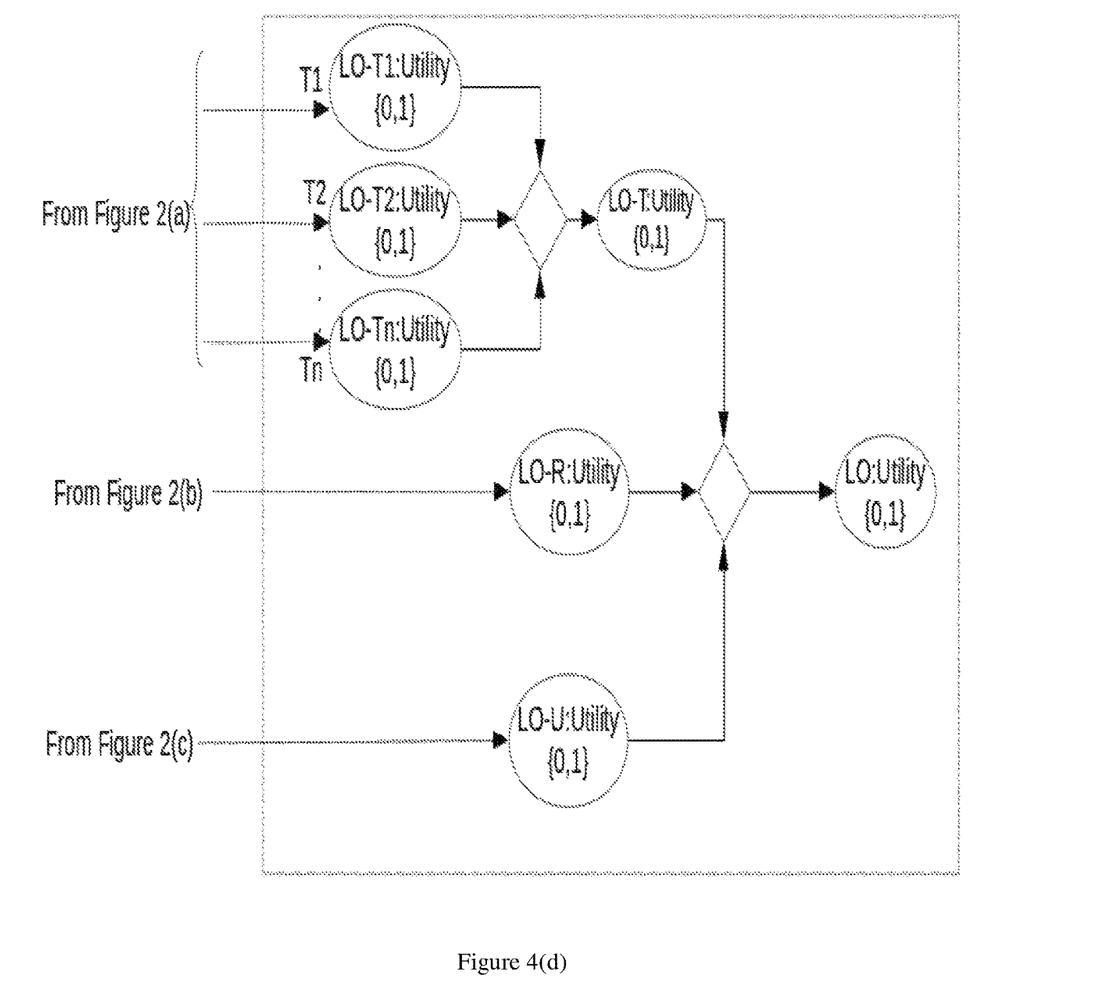

(iii) User Profile Utility:

FIG. 4(c) depicts the Bayesian network used to compute utility of a learning content with respect to user background. It involves the premise of recommending neither too difficult nor too elementary content to a user at a certain proficiency level. The utility with respect to a user is represented by the node "LO-U: Utility", which is a binary node with state 1 representing that the learning object is suitable in the given context. The state of this variable is influenced by two variables "LO: Difficulty" that represents the difficulty level of a learning object and "U-LO: Min Prof" that represents users minimum, proficiency level in the topics covered by the learning object. The two variables can assume the values {0 . . . 4} and {0 . . . 5}. The CPT (Conditional probability Table) provides the conditional dependencies between the variables.

Once the utility values related to each of role, task and user profile are obtained, they are combined for recommendation. The inputs to this stage are:

a) A set of probability values for task utilities obtained from multiple instances of the Bayesian network as depicted in FIG. 4(a), one for each of the tasks assigned to a user;
b) A probability value for role utility obtained from the Bayesian network depicted in FIG. 4(b);
c) A probability value for user utility obtained from the Bayesian network depicted in FIG. 4(c).

The network used for the integration is shown in FIG. 4(d). The integration is done in two stages. In the first stage, the utility values for the different tasks are combined to find an overall task utility ("LO-T: Utility"). A sigmoid Conditional Probability Distribution (CPD) function is used for this purpose. At the second stage, the utility values of the learning object from the three perspectives, namely task, role and learner/use are combined, again using a sigmoid CPD function. The guiding policy for assignment of weights has been to prioritize the task and role contexts over the user context. The combined probability value at the node "LO: Utility" represents the overall utility of learning object and can be used for contextual ranking.

The ranking algorithm mentioned above runs the risk of producing too many similar contents on the top of the list, thereby over-recommending for certain proficiencies required in the context while depriving the others. This is particularly true, if the learning object collection is quite large and contains many similar and competing contents, which can be quite common, e.g. a number of textbooks by different authors to learn a programming language. The learning object need to be re-ranked to bring in some diversity in the recommendations. Increasing diversity implies redefining the utility value of the items in such a way that the utility value of an item decreases if there are similar items in the recommendation list. In one embodiment, a way to model the problem is to combine utility and diversity scores and rank the items based on the combined score. The diversity of an item is not its innate property, but depends on other selected items, making the re-ranking problem an optimization problem with permutations and with complexity n!.

In an alternate embodiment, a greedy algorithm that essentially recomputes the utility of an item based on similarity with other items ahead in the list has a complexity $O(n^2)$ can produce satisfactory result. The similarity measure between two learning objects can be based on a subset of the LOM (Learning Object Metadata). The complement of Jaccard coefficient of the topics is chosen to achieve diversity in terms of topic coverage.

The system 100 enhances the performance of recommendation, significantly reduces the execution time, reduces the performance overhead and is also helpful in ignoring the irrelevant results for a given use case. The conditional set of probabilities define the degree of dependence of final output on several factors important in recommendation. Few of such important factors are: User's proficiencies in various topics, time given for a task, expected level of proficiency required by the user on the topics given, etc. The final list of recommendations will have learning objects based on the topics from Task based requirements and Role based Skill requirements. So the proposed system 100 aims at recommending a list of learning objects to a user relevant to his task/tasks at hand and role based skills required.

The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

What is claimed is:

1. A computer implemented method for enabling contextual recommendation of relevant learning content from multitude of learning contents, comprising:
    maintaining in at least one repository plurality of learning contents sourced from a corpora of structured or unstructured sources;
    generating a data model defining a learner associated contextual information;
    computing one or more utility values of the plurality of learning contents using probabilistic reasoning being conditioned by the data model so generated, wherein the probabilistic reasoning is exercised for each learning content independently to determine contextual utility, wherein the probabilistic reasoning is a Bayesian network computing utility values through one of:

initializing a learner job context input node based on a content utility and a time utility, wherein the content utility is a binary node representing similarity between topics required in the task and topics available in the learning content, wherein the content utility of the learning object in the job context depends on a topic proficiency node required by the task and an expected proficiency level node on using the learning content, wherein the topic proficiency node is instantiated to a state from one of values {1, 2, 3, 4, 5} corresponding to a maximum of required proficiency values required for the task with respect to topics covered in the learning object, and the expected proficiency level node is instantiated to a state from one of values {0, 1, 2, 3, 4, 5}, wherein the time utility is a binary node and state of the binary node include causal relationship with a typical learning time node for the content instantiated to one of value from {0, 1, 2, 3, 4} and a time available node for the task instantiated to one of value from {0, 1, 2} and computing the utility value of the learning object in the job context depends on the content utility and the time utility;

initializing a learner role node that is characterized by an array of topic and proficiency, and utility of the learning object with respect to the role assigned to the learner depends on a topic proficiency node required by the task and an expected proficiency level node on using the learning content, wherein the topic proficiency node is instantiated to a state from one of values {1, 2, 3, 4, 5} corresponding to a maximum of required proficiency values required for the task with respect to topics covered in the learning object, and the expected proficiency level node is instantiated to a state from one of values {0, 1, 2, 3, 4, 5};

initializing a learner profile input node which is a binary node and state of the learner profile input node is influenced by a difficulty level node of the learning object instantiated to one of value from {0, 1, 2, 3, 4}, and a minimum proficiency node instantiated to one of value from {0, 1, 2, 3, 4, 5} representing minimum proficiency level in the topics covered by the learning object;

wherein the causal relationship being derived using conditional probability tables, wherein initializing at least one of the learner job context input node, learner role node, learner profile input node corresponds to initializing to a state based on the computed utility values of the learner and attributes of the plurality of learning contents leading to propagation of a belief in the Bayesian network, wherein the attributes of the plurality of learning contents includes topics covered, depth of the learning contents and estimated learning time, wherein utility of the learning content with respect to the task assigned is independently determined by the Bayesian network; and combining utility values associated with each of the learner job context input node received as a set of probability values for task obtained from multiple instances of the Bayesian network, the learner role node received as a probability value for the role and the learner profile input node for each of the learning content received as a probability value for the learner using a sigmoid conditional probability distribution function;

combining the utility values associated with each of the learner associated contextual information to obtain an aggregated utility value for each learning content of the plurality of learning contents;

building a virtual library for the plurality of learning contents through a collaborative effort of subject experts and reference librarians, and automatically creating metadata for the plurality of learning contents; and recommending the most relevant learning content to the learner by comparing the aggregated utility values obtained for the each learning contents;

wherein the maintaining, the generating, the combining and the recommending are performed by a processor using programmed instructions stored in a repository.

2. The computer implemented method according to claim 1, wherein the learner associated contextual information comprises learner profile, learner job context, learner role or a combination thereof.

3. The computer implemented method according to claim 2, wherein the learner profile is modeled based at least on learner proficiency levels.

4. The computer implemented method according to claim 2, wherein the learner job context is modeled based at least on task assigned to the learner, learner's defined level of proficiency to complete the task in a given amount of time, time frame allocated to obtain desired proficiency level in assigned task, time allocated to complete the assigned task or a combination thereof.

5. The computer implemented method according to claim 2, wherein the learner role is modeled based at least on current proficiency level of the learner, expected proficiency level of the learner, learner's learning goals and aspirations, resource type, content coverage and depth or a combination thereof.

6. The computer implemented method according to claim 1, wherein the structured and unstructured sources comprise technical blogs, tutorials, e-books, digital libraries, video lectures, web-based and so on, corporate intranet or have subscription based access.

7. The computer implemented method according to claim 1, wherein the utility values associated with the learner job context input node, the learner role input node and the learner profile input node are combined using sigmoid conditional probability distribution function such that precedence is assigned to at least one of the job context input node, the learner role input node and the learner profile input node so as to rank the learning contents in order of their relevance as and when needed.

8. The computer implemented method according to claim 1, wherein the learning contents are ranked in order of their relevance by re-computing and recombining the utility values to accord lower utility values to the learning contents exhibiting close similarity there between by applying greedy algorithm.

9. A system for enabling contextual recommendation of relevant content from multitude of learning contents, comprising:
a processor;
input means and output means, each in electronic communication with the processor;
at least one repository operatively connected to the processor having resident thereon a database comprising plurality of learning content sourced from a corpora of structured or unstructured sources;

wherein the processor operable to perform steps of:
generating a data model defining a learner associated contextual information;
computing one or more utility values of the plurality of learning content using probabilistic reasoning being conditioned by the data model so generated, wherein the probabilistic reasoning is exercised for each learning content independently to determine contextual utility, wherein the probabilistic reasoning is a Bayesian network computing utility values through one of:
 initializing a learner job context input node based on a content utility and a time utility, wherein the content utility is a binary node representing similarity between topics required in the task and topics available in the learning content, wherein the content utility of the learning object in the job context depends on a topic proficiency node required by the task and an expected proficiency level node on using the learning content, wherein the topic proficiency node is instantiated to a state from one of values {1, 2, 3, 4, 5} corresponding to a maximum of required proficiency values required for the task with respect to topics covered in the learning object, and the expected proficiency level node is instantiated to a state from one of values {0, 1, 2, 3, 4, 5}, wherein the time utility is a binary node and state of the binary node include causal relationship with a typical learning time node for the content instantiated to one of value from {0, 1, 2, 3, 4} and a time available node for the task instantiated to one of value from {0, 1, 2} and computing the utility value of the learning object in the job context depends on the content utility and the time utility;
 initializing a learner role node that is characterized by an array of topic and proficiency, and utility of the learning object with respect to the role assigned to the learner depends on a topic proficiency node required by the task and an expected proficiency level node on using the learning content, wherein the topic proficiency node is instantiated to a state from one of values {1, 2, 3, 4, 5} corresponding to a maximum of required proficiency values required for the task with respect to topics covered in the learning object, and the expected proficiency level node is instantiated to a state from one of values {0, 1, 2, 3, 4, 5};
 initializing a learner profile input node which is a binary node and state of the learner profile input node is influenced by a difficulty level node of the learning object instantiated to one of value from {0, 1, 2, 3, 4}, and a minimum proficiency node instantiated to one of value from {0, 1, 2, 3, 4, 5} representing minimum proficiency level in the topics covered by the learning object;
wherein, the causal relationship being derived using conditional probability tables, wherein initializing at least one of the learner job context input node, learner role node, learner profile input node corresponds to initializing to a state based on the computed utility values of the learner and attributes of the plurality of learning contents leading to propagation of a belief in the Bayesian network, wherein the attributes of the plurality of learning contents includes topics covered, depth of the learning contents and estimated learning time, wherein utility of the learning content with respect to the task assigned is independently determined by the Bayesian network; and
combining utility values associated with each of the learner job context input node received as a set of probability values for task obtained from multiple instances of the Bayesian network, the learner role node received as a probability value for the role and the learner profile input node for each of the learning content received as a probability value for the learner using a sigmoid conditional probability distribution function;
combining the utility values associated with each of learner associated contextual information to obtain an aggregated utility value for each learning content of the plurality of learning contents;
building a virtual library for the plurality of learning contents through a collaborative effort of subject experts and reference librarians, and automatically creating metadata for the plurality of learning contents; and
recommending the most relevant learning content to the learner by comparing aggregated utility values obtained for the each learning contents.

10. The system according to claim 9, wherein the learner associated contextual information comprises learner profile, learner job context, learner role or a combination thereof.

11. The system according to claim 9, wherein the utility values associated with the learner job context input node, the learner role input node and the learner profile input node are combined using sigmoid conditional probability distribution function such that precedence is assigned to at least one of the job context input node, the learner role input node and the learner profile input node so as to rank the learning contents in order of their relevance as and when needed.

12. The system according to claim 9, wherein the learning contents are ranked in order of their relevance by re-computing and re-combining the utility values to accord lower utility values to the learning contents exhibiting close similarity there between by applying greedy algorithm.

13. A computer program product for enabling contextual recommendation of relevant content comprising a non-transitory computer readable medium having program instructions embodied therein for:
maintaining, in at least one repository, plurality of learning contents sourced from a corpora of structured or unstructured sources;
generating a data model defining a learner associated contextual information;
computing one or more utility values of the plurality of learning contents using probabilistic reasoning being conditioned by the data model so generated, wherein the probabilistic reasoning is exercised for each learning content independently to determine contextual utility, wherein the probabilistic reasoning is a Bayesian network computing utility values through one of:
 initializing a learner job context input node based on a content utility and a time utility, wherein the content utility is a binary node representing similarity between topics required in the task and topics available in the learning content, wherein the content utility of the learning object in the job context depends on a topic proficiency node required by the task and an expected proficiency level node on using the learning content, wherein the topic proficiency node is instantiated to a state from one of values {1, 2, 3, 4, 5} corresponding to a maximum of required proficiency values required for the task with respect to topics covered in the learning object, and the expected proficiency level node is instantiated to a state from one of values {0, 1, 2, 3, 4, 5}, wherein the time utility is a binary node and state of the binary node include causal relationship with a typical learning time node for the content instantiated to one of value from {0, 1, 2, 3, 4} and a time available node for the task instantiated to one of value from {0, 1, 2} and computing the utility value of the learning object in the job context depends on the content utility and the time utility;

initializing a learner role node that is characterized by an array of topic and proficiency, and utility of the learning object with respect to the role assigned to the learner depends on a topic proficiency node required by the task and an expected proficiency level node on using the learning content, wherein the topic proficiency node is instantiated to a state from one of values {1, 2, 3, 4, 5} corresponding to a maximum of required proficiency values required for the task with respect to topics covered in the learning object, and the expected proficiency level node is instantiated to a state from one of values {0, 1, 2, 3, 4, 5};

initializing a learner profile input node which is a binary node and state of the learner profile input node is influenced by a difficulty level node of the learning object instantiated to one of value from {0, 1, 2, 3, 4}, and a minimum proficiency node instantiated to one of value from {0, 1, 2, 3, 4, 5} representing minimum proficiency level in the topics covered by the learning object;

wherein the causal relationship being derived using conditional probability tables, wherein initializing at least one of the learner job context input node, learner role node, learner profile input node corresponds to initializing to a state based on the computed utility values of the learner and attributes of the plurality of learning contents leading to propagation of a belief in the Bayesian network, wherein the attributes of the plurality of learning contents includes topics covered, depth of the learning contents and estimated learning time, wherein utility of the learning content with respect to the task is independently determined by the Bayesian network; and combining utility values associated with each of the learner job context input node received as a set of probability values for task obtained from multiple instances of the Bayesian network, the learner role node received as a probability value for the role and the learner profile input node for each of the learning content received as a probability value for the learner using a sigmoid conditional probability distribution function;

combining the utility values associated with each of the learner associated contextual information to obtain an aggregated utility value for each learning content of the plurality of learning contents;

building a virtual library for the plurality of learning contents through a collaborative effort of subject experts and reference librarians, and automatically creating metadata for the plurality of learning contents; and recommending the most relevant learning content to the learner by comparing the aggregated utility values obtained for the each learning contents.

* * * * *